US008835027B2

(12) United States Patent
Thackeray et al.

(10) Patent No.: US 8,835,027 B2

(45) Date of Patent: Sep. 16, 2014

(54) POSITIVE ELECTRODES FOR LITHIUM BATTERIES

(75) Inventors: Michael M. Thackeray, Naperville, IL (US); Sun-Ho Kang, Naperville, IL (US); Christopher S. Johnson, Napeville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1378 days.

(21) Appl. No.: 12/284,201

(22) Filed: Sep. 19, 2008

(65) Prior Publication Data

US 2009/0081529 A1 Mar. 26, 2009

Related U.S. Application Data

(60) Provisional application No. 60/994,874, filed on Sep. 21, 2007.

(51) Int. Cl.

| | |
|---|---|
| ***H01M 4/48*** | (2010.01) |
| ***H01M 4/131*** | (2010.01) |
| ***H01M 10/052*** | (2010.01) |
| ***H01M 4/36*** | (2006.01) |
| *H01M 4/505* | (2010.01) |
| *H01M 4/58* | (2010.01) |
| *H01M 4/485* | (2010.01) |

(52) U.S. Cl.

CPC .............. *H01M 4/131* (2013.01); *Y02E 60/122* (2013.01); *H01M 4/505* (2013.01); *H01M 10/052* (2013.01); *H01M 4/366* (2013.01); *H01M 4/5825* (2013.01); *H01M 4/485* (2013.01); *Y02T 10/7011* (2013.01)

USPC ........ 429/52; 429/231.95; 429/224; 429/221; 429/231.5

(58) Field of Classification Search

USPC ............ 429/52, 231.95, 224, 221, 231.5, 223

See application file for complete search history.

(56) References Cited

U.S. PATENT DOCUMENTS

| | | | | |
|---|---|---|---|---|
| 7,303,840 | B2 | 12/2007 | Thackeray et al. | |
| 2002/0064498 | A1 * | 5/2002 | Tabuchi et al. | 423/594 |
| 2003/0124423 | A1 * | 7/2003 | Sasaki et al. | 429/221 |
| 2003/0157409 | A1 * | 8/2003 | Huang | 429/306 |
| 2004/0048157 | A1 * | 3/2004 | Neudecker et al. | 429/231.2 |
| 2004/0121234 | A1 * | 6/2004 | Le | 429/231.1 |
| 2008/0070122 | A1 * | 3/2008 | Park et al. | 429/330 |

OTHER PUBLICATIONS

K. Numata, S. Yamanaka. Preparation and electrochemical properties of layered lithium—cobalt—manganese oxides, Solid State Ionics 1999, 118, 117-120.*

J.-S. Kim, C.S. Johnson, J.T. Vaughey, M.M. Thackeray. Pre-conditioned layered electrodes for lithium batteries, J. Power Sources 2006, 153, 258-264.*

Jeom Soo Kim et al., Electrochemical and Structural Properties . . . , Chem. Mater. 2004 vol. 16, 1996-2006.

L.A. de Picciotto et al., Structural Characterization of . . . Single-Crystal X-ray Diffraction, Solid State Ionics 62 (1993) 297-307.

* cited by examiner

*Primary Examiner* — Carlos Barcena

(74) *Attorney, Agent, or Firm* — Olson & Cepuritis, Ltd.

(57) ABSTRACT

This invention provides lithium-rich compounds as precursors for positive electrodes for lithium cells and batteries. The precursors comprise a $Li_2O$-containing compound as one component, and a second charged or partially-charged component, selected preferably from a metal oxide, a lithium-metal-oxide, a metal phosphate or metal sulfate compound. $Li_2O$ is extracted from the above-mentioned electrode precursors to activate the electrode either by electrochemical methods or by chemical methods. The invention also extends to methods for synthesizing and activating the precursor electrodes and to cells and batteries containing such electrodes.

18 Claims, 14 Drawing Sheets

● = $LiV_3O_8$; ◆ = $Li_2MnO_3$; c = graphite; sh = sample holder; Al = aluminum current collector

POSITIVE ELECTRODES FOR LITHIUM BATTERIES

CROSS-REFERENCE TO RELATED APPLICATIONS

This application claims the benefit of U.S. Provisional Application Ser. No. 60/994,874, filed on Sep. 21, 2007, which is incorporated herein by reference in its entirety.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention relates to positive electrodes (cathodes) for lithium cells and batteries, notably rechargeable lithium-ion cells and batteries. These batteries are used to provide power for a wide range of applications such as portable telecommunications equipment, computers, medical devices, electric vehicles, and hybrid-electric vehicles.

BACKGROUND OF THE INVENTION

Electrochemical energy conversion and storage in new, advanced battery systems will undoubtedly contribute to finding solutions to the world's energy problems and, in particular, to lessening its dependence on fossil fuels for transportation. Non-aqueous, lithium batteries offer the most flexible chemistries and the best promise for greater-than-incremental improvement over known battery systems, particularly in terms of their practical energy and power performance.

The most significant advantage of lithium batteries over aqueous systems is that they can operate at voltages significantly higher than the decomposition potential of water (about 1.2 V). Despite the progress that has been made in recent years with conventional $Li_xC_6/LiCoO_2$ cells that operate at about 4 V, the energy and power densities of rechargeable lithium-ion batteries for the mass storage of energy, e.g., for large scale applications such as electric vehicles and plug-in hybrid electric vehicles, are still limited by the specific and volumetric capacities of the electrode materials currently in use. New materials are required to advance lithium battery technology. The present invention provides novel positive electrode (cathode) materials, for a future generation of lithium electrochemical cells and batteries. The invention also provides examples of such electrode materials, methods for synthesizing the electrodes, and evaluating the electrodes in non-aqueous lithium cells.

SUMMARY OF THE INVENTION

This invention relates to materials that can be used as precursors for positive electrodes in non-aqueous lithium cells and batteries, preferably rechargeable lithium-ion cells and batteries, and to the positive electrodes formed therefrom. More specifically, the invention relates to precursor materials for positive electrodes containing lithium cations, other metal cations, and charge balancing anions. The precursor material comprises a first component, containing one or more $Li_2O$-containing materials such as those with Mn, V, Fe and Ti cations, for example, $Li_2MnO_3$ ($Li_2O.MnO_2$), $LiV_3O_8$ ($Li_2O.3V_2O_5$), $Li_3VO_4$ ($3Li_2O.V_2O_5$), $LiFe_5O_8$ ($Li_2O.2.5Fe_2O_3$), $LiFeO_2$ ($Li_2O.Fe_2O_3$), $Li_5FeO_4$ ($5Li_2O.Fe_2O_3$), $Li_2TiO_3$ ($Li_2O.TiO_2$; Li:Ti=2:1), Alternatively, the first component may comprise an intergrown material having a composite structure or a blended material, in which the intergrown or blended materials each include two or more $Li_2O$-containing components of different molecular structure, such as $Li_2MnO_3.LiMO_2$ where M comprises a metal cation, typically one or more transition metal cations such as Mn, Ni and/or Co cations, or the first component may comprise structurally integrated or blended $Li_2MnO_3.LiM'_2O_4$ compounds where M' typically comprises one or more metal cations, such as Li and Mn cations. The electrode precursor materials also comprise a second component, containing one or more charged or partially-charged electrode compounds that can react with an integral or fractional molar quantity of lithium, based on the molecular formula of the charged material and partially charged material respectively, during the charging and discharging of the electrode when included in an electrochemical cell, preferably, but not exclusively, selected from a metal oxide, a lithium metal oxide, a metal phosphate, or a metal sulfate, such as $MnO_2$, $V_2O_5$, $L_{1+x}V_3O_8$ ($0 \le x \le 0.3$), $Fe_2O_3$, $Li_{1-y}FePO_4$ ($0<y\le 1$) or $Fe_2(SO_4)_3$, with the proviso that at least one of the electrode components does not contain manganese. The second component may also be a $Li_2O$-containing compound such as $LiV_3O_8$($Li_2O.3V_2O$) that represents an example of a charged electrode compound that can react with lithium to form $Li_4V_3O_8$. According to the invention, $Li_2O$ is extracted from the above-mentioned electrode precursors to activate the electrode either directly by electrochemical methods by applying a sufficiently high potential in an electrochemical cell, or by chemical methods, e.g., by reaction with an acidic medium having a 0<pH<7. The present invention also encompasses methods for synthesizing the precursor lithium-metal-oxide electrodes, as well as lithium cells and batteries containing such precursor electrodes.

BRIEF DESCRIPTION OF THE DRAWINGS

The invention comprises certain novel features hereinafter fully described, and illustrated in the accompanying drawings, it being understood that various changes in the details may be made without departing from the spirit, or sacrificing any of the advantages of the present invention.

$(0.5Li_2MnO_3.0.5LiNi_{0.44}Co_{0.25}Mn_{0.31}O_2).0.1Li_{1.2}V_3O_8$ electrode powder prepared at 450° C.

Figure 6:
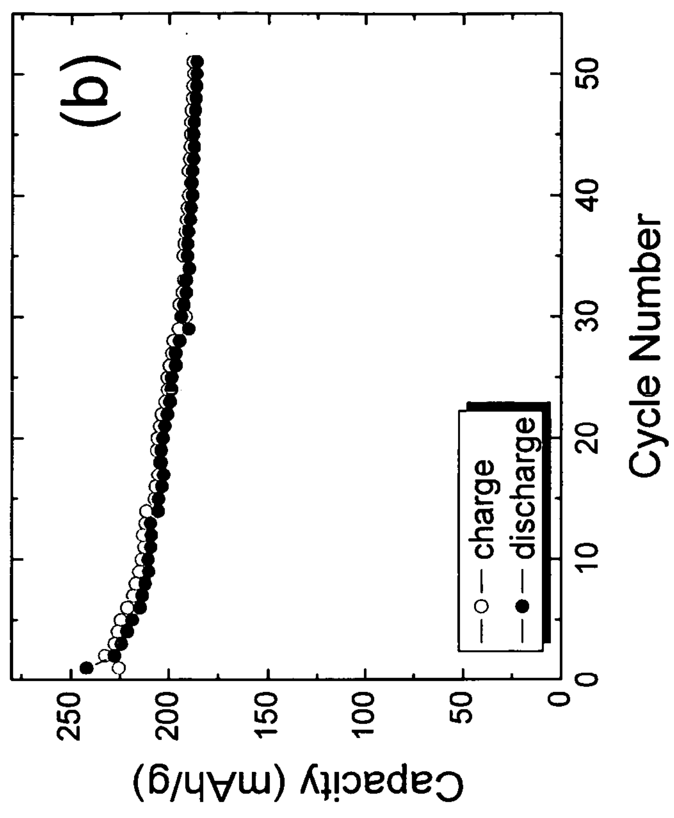
Figure 6:
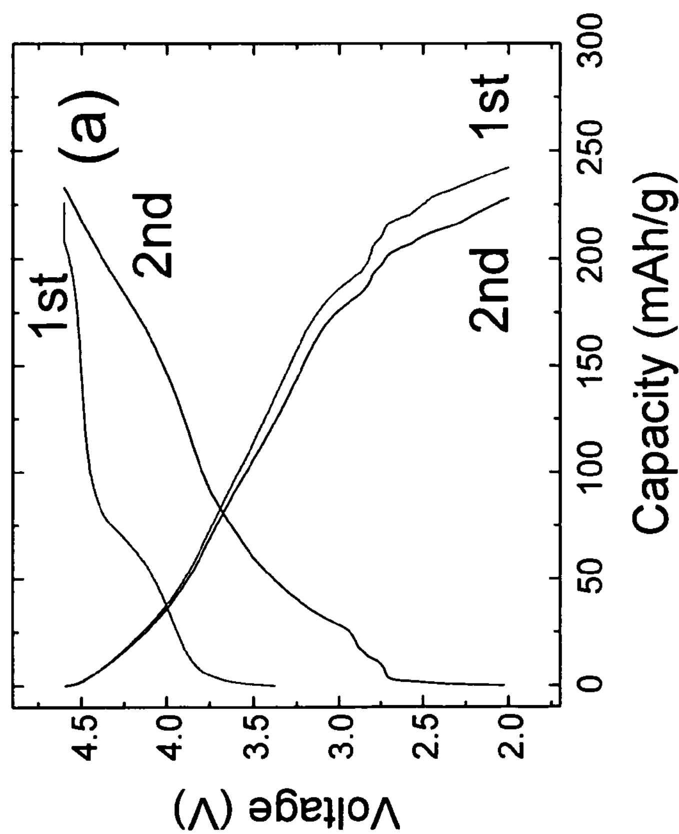

FIG. 6 is a graphical representation of a) the relationship between the voltage and capacity for an initial charge and subsequent discharge/charge cycles of a Li/0.9 $(0.5Li_2MnO_3.0.5LiNi_{0.44}Co_{0.25}Mn_{0.31}O_2).0.1Li_{1.2}V_3O_8$ cell operated at room temperature, and b) a capacity vs. cycle number plot of the same cell for 50 cycles.

Figure 7:
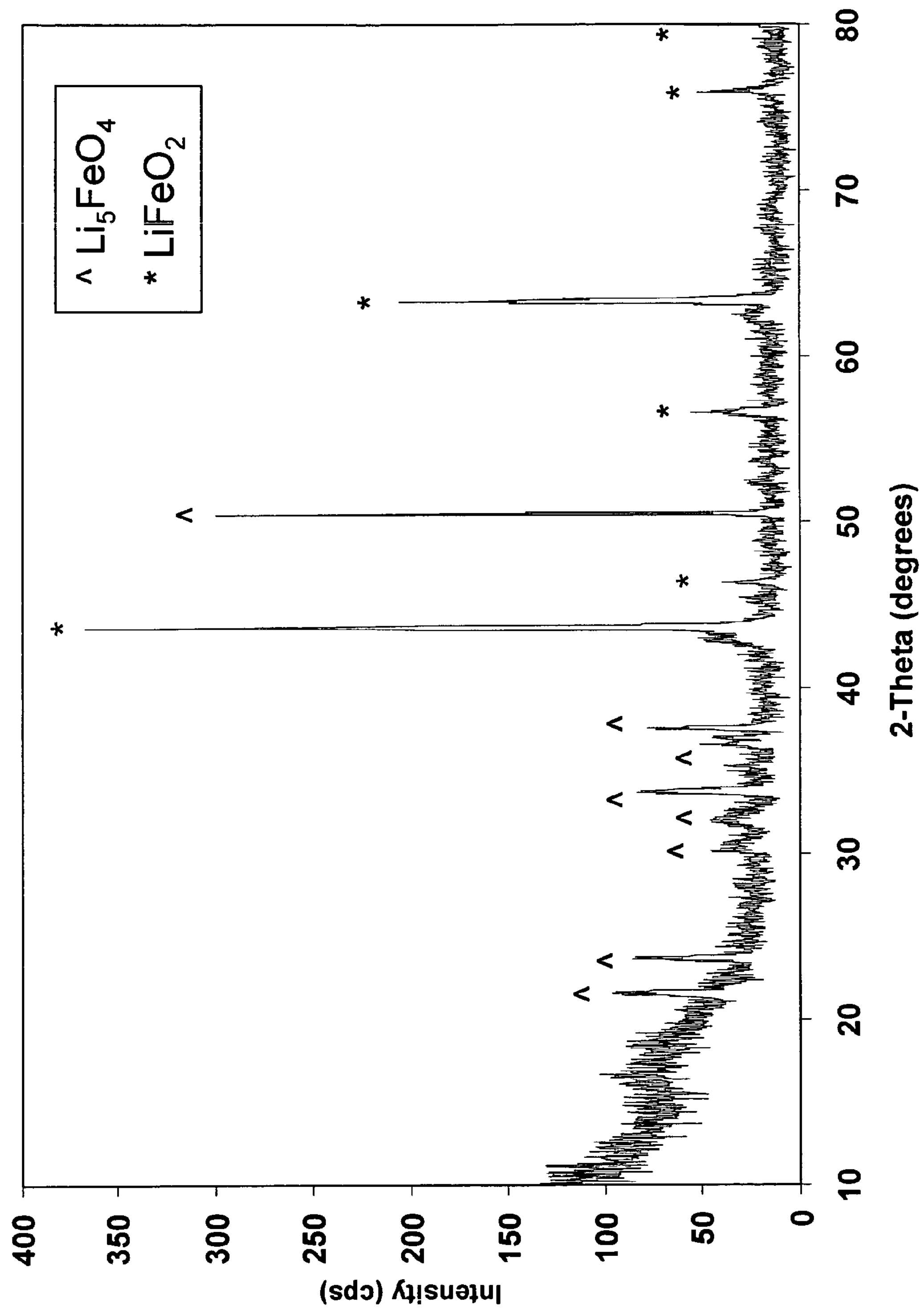

FIG. 7 is an illustration of the powder X-ray diffraction pattern of a composite $xLi_5FeO_4.(1-x)LiFeO_2$ $(0.5 \leq x \leq 0.6)$ electrode powder prepared at 900° C.

Figure 8:
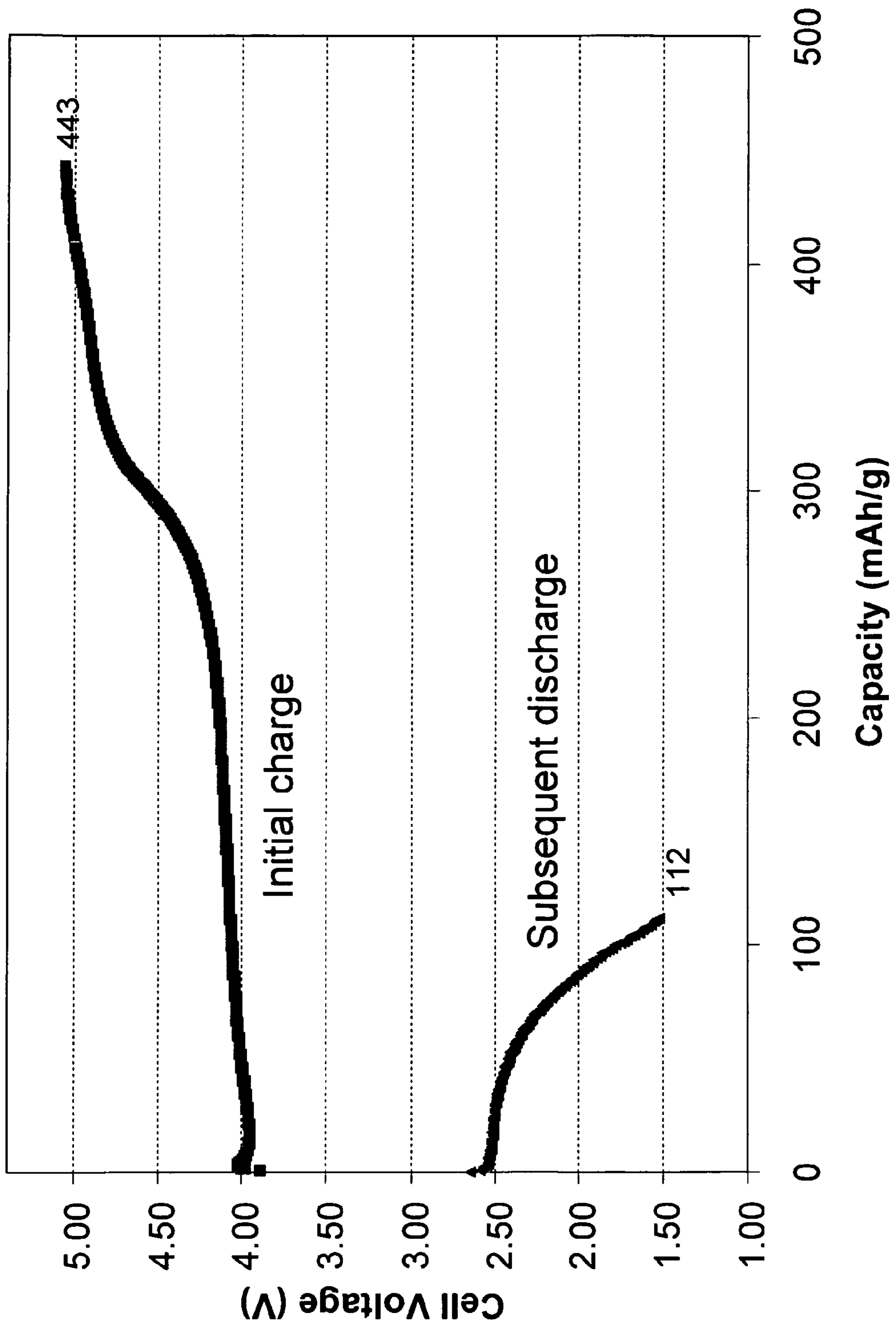

FIG. 8 is a graphical representation of the relationship between the voltage and capacity for an initial charge and subsequent discharge of a $Li/xLi_5FeO_4.(1-x)LiFeO_2$ $(0.5 \leq x \leq 0.6)$ cell operated at room temperature.

Figure 9:
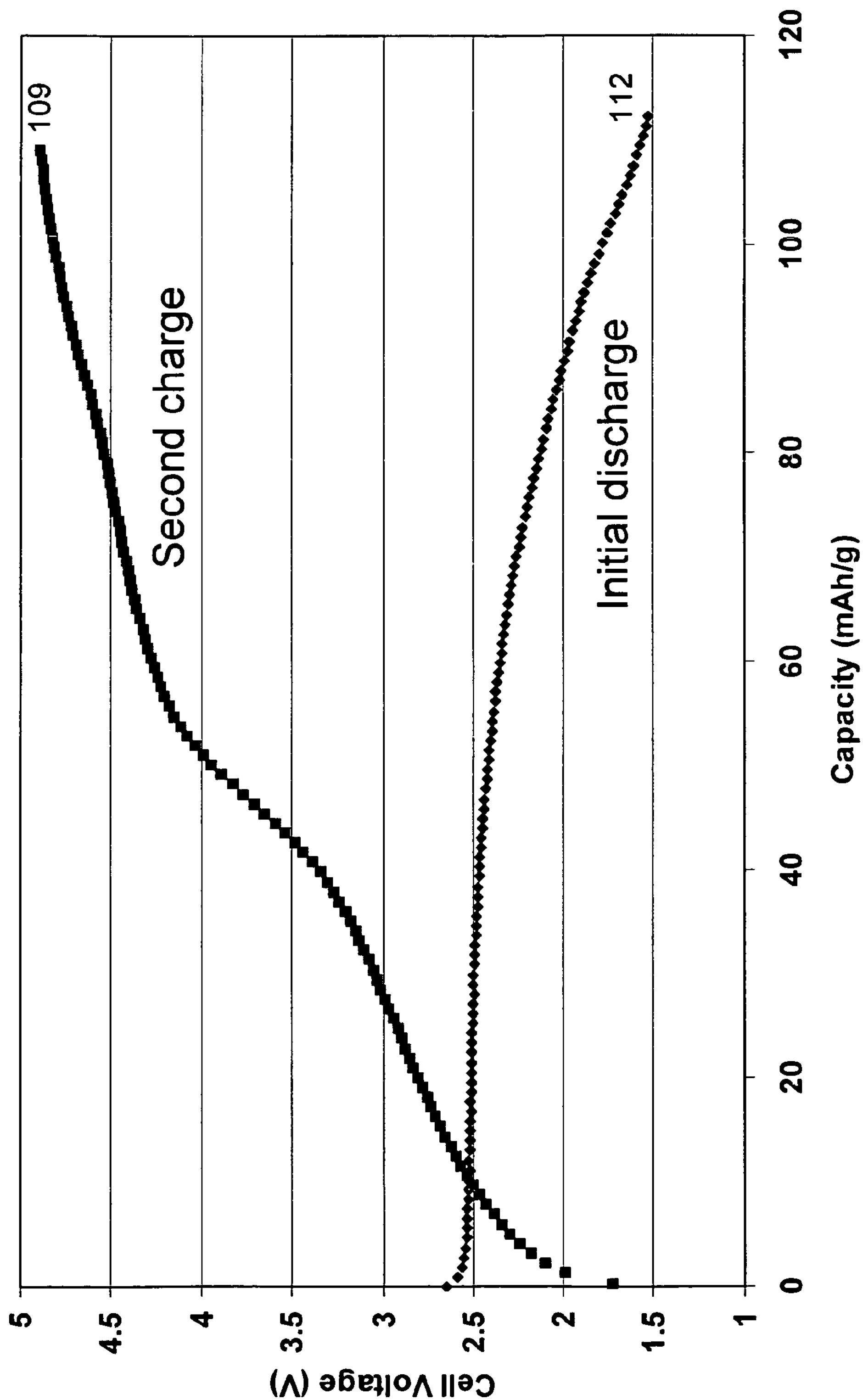

FIG. 9 is a graphical representation of the relationship between the voltage and capacity for the initial discharge and second charge of a $Li/xLi_5FeO_4.(1-x)LiFeO_2$ cell operated at room temperature.

Figure 10:
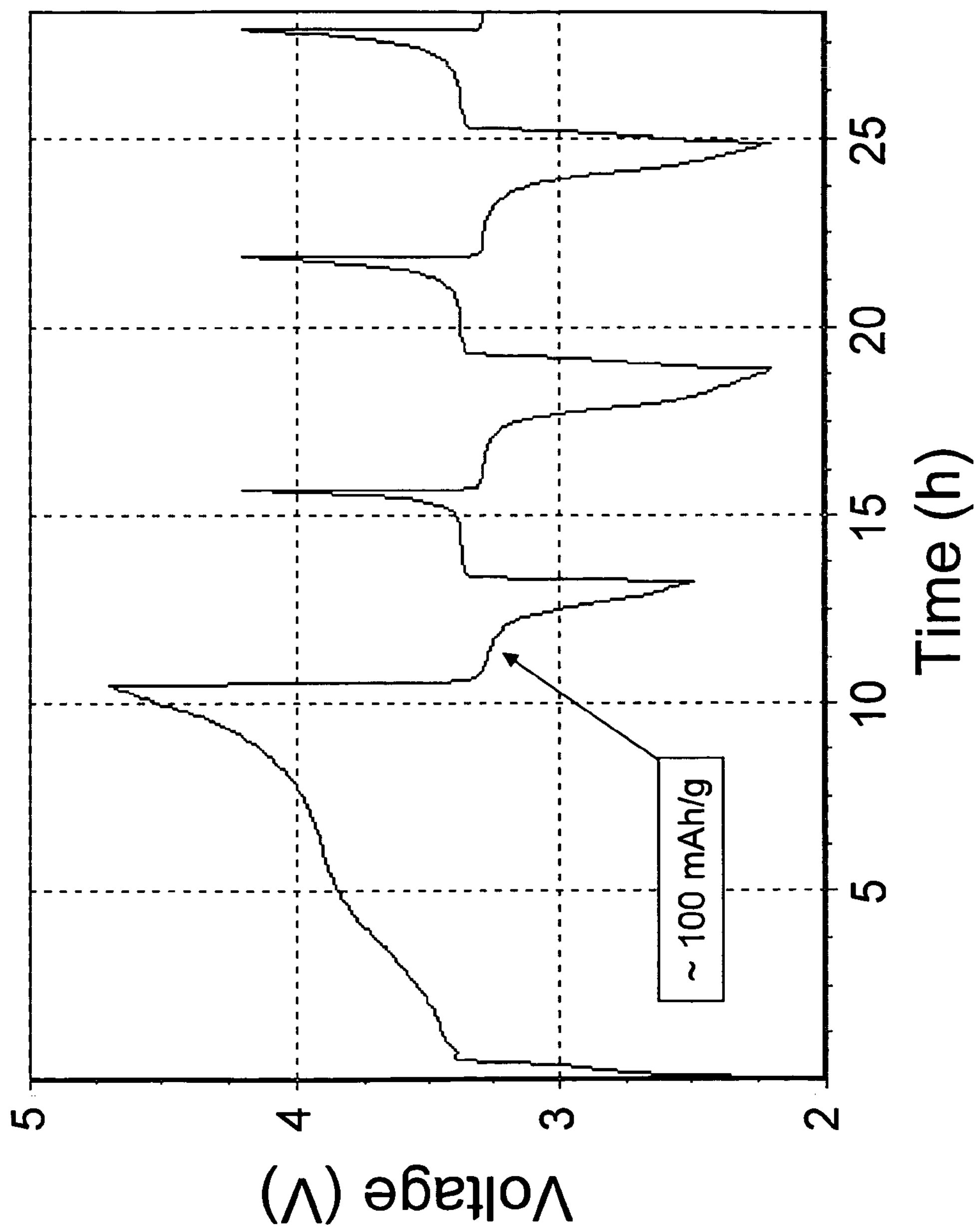

FIG. 10 is a graphical representation of the relationship between the voltage and capacity for an initial charge and subsequent three discharge/charge cycles of a $C_6/Li_5FeO_4.FePO_4$ cell operated at room temperature.

FIG. 11 is a graphical representation of a) the relationship between the voltage and time for an initial charge and subsequent discharge of a $C_6/Li_5FeO_4.Li_{1.2}V_3O_8$ cell operated at room temperature, and b) the relationship between voltage and capacity for the subsequent six discharge cycles.

Figure 12:
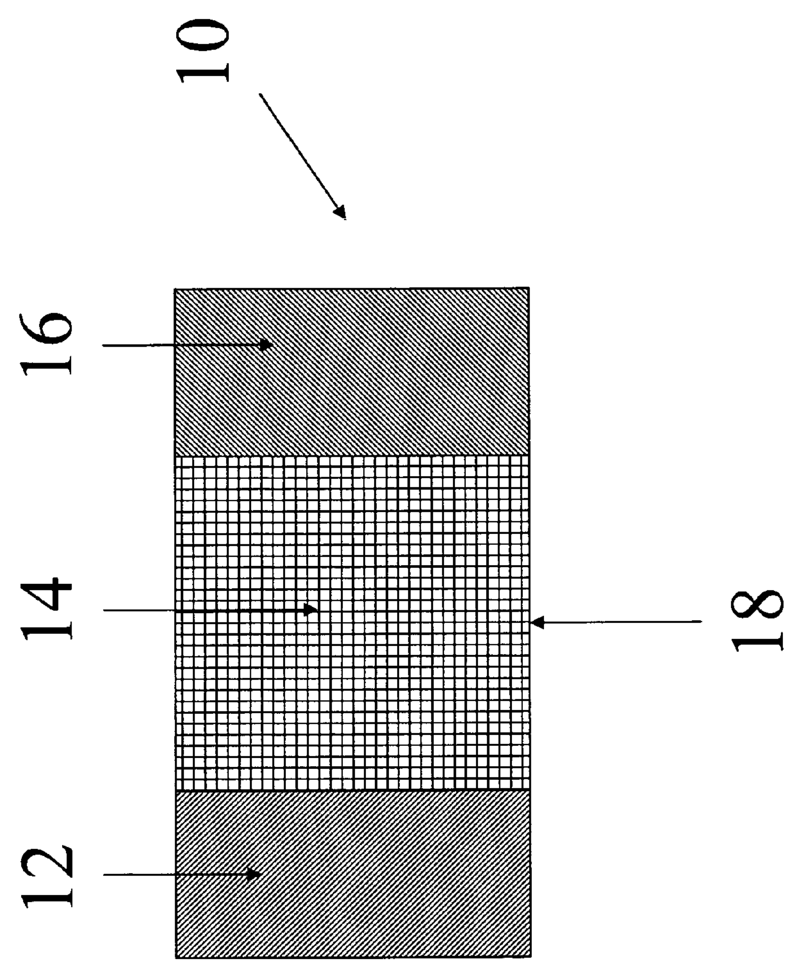

FIG. 12 is a schematic representation of an electrochemical cell.

Figure 13:
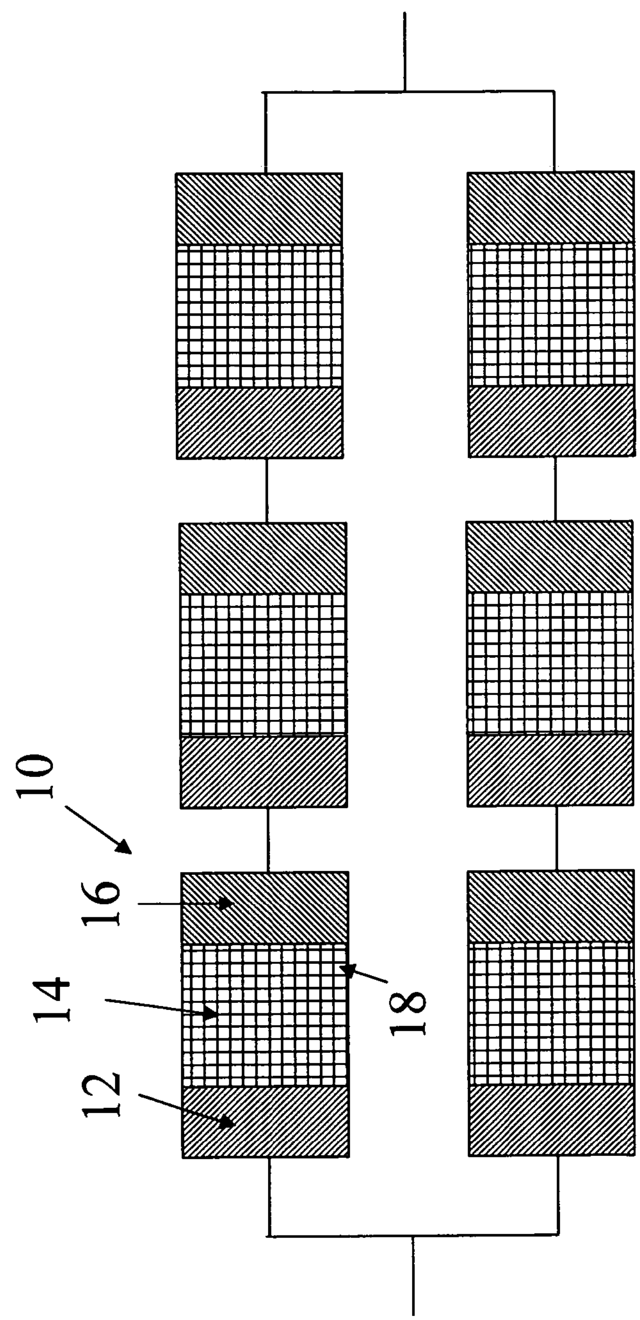

FIG. 13 is a schematic representation of a battery consisting of a plurality of cells connected electrically in series and in parallel.

DETAILED DESCRIPTION OF PREFERRED EMBODIMENTS

State-of-the-art $Li_xC_6/LiCoO_2$ lithium-ion batteries are limited by the theoretical specific capacity of the graphite anode (about 372 mAh/g) and $LiCoO_2$ cathode (about 280 mAh/g). In practice, the graphite anode provides approximately 300-350 mAh/g, while the $LiCoO_2$ cathode provides only approximately 130-140 mAh/g. By contrast, lithium metal or a metal anode that alloys with lithium, such as Sn, offers a significantly higher theoretical capacity than a graphite anode (about 3863 mAh/g for lithium and 994 mAh/g for Sn). In addition, the relatively high density of metal alloys, typically $\rho > 4$ g/cm$^3$, provides anodes with significantly higher volumetric capacity compared to graphite ($\rho = 2.2$ g/cm$^3$). Manganese and vanadium oxide cathodes, such as $MnO_2$, $V_2O_5$ and $LiV_3O_8$ $(Li_2O.3V_2O_5)$, which can be used directly as cathodes in the charged state, offer theoretical capacities in the range of about 300-440 mAh/g, respectively, of which approximately 250-300 mAh/g has been realized in practice. In addition, manganese-based electrodes with integrated or blended composite structures, such as 'layered-layered' $xLi_2MnO_3.(1-x)LiMO_2$ (e.g., M=Mn, Ni, Co) structures, as disclosed by Kim et al. in Chemistry of Materials, Volume 16, page 1996 (2004), and 'layered-spinel' $xLi_2MnO_3.(1-x)LiMn_{2-y}M_yO_4$ (e.g., M=Li, Ni, Co, Mg, Al) structures, as disclosed in U.S. Pat. No. 7,303,840, the entire disclosures of which are incorporated by reference, have been reported to yield capacities close to 250 mAh/g at relatively low current rates. In U.S. Pat. No. 7,303,840, the layered-spinel components have a $Li_2O$-containing component $(Li_2MnO_3)$ and a partially charged spinel component $(LiMn_{2-y}M_yO_4)$ but fall outside the scope of this invention because both components contain Mn.

In principle, the lithium cells with the electrode components of this invention can significantly increase the capacity and energy delivered by conventional lithium-ion cells that are assembled in the discharged state. In one embodiment of the invention, new positive electrode (cathode) precursor materials for lithium cells are disclosed, notably those containing at least one component from which $Li_2O$ can be extracted, either electrochemically or chemically, in combination with one or more charged electrode components, the $Li_2O$-containing component being used to activate and enhance the capacity of the electrode. Broadly speaking, the invention relates to positive electrode precursors containing surplus lithium that can be extracted electrochemically at high potentials to load carbon-, metal-, semi-metal-, intermetallic-, and metal oxide anode materials, such as graphite, Sn, Si, $Cu_6Sn_5$ and $Li_4Ti_5O_{12}$ materials, respectively, with lithium during the initial charging process, the lithiated anode materials being able to provide sufficient lithium on the subsequent discharge to both the activated electrode component and to the charged electrode component contained in the initial parent precursor electrode.

When lithium is extracted from the precursor electrode as $Li_2O$, both lithium ions and oxygen are released from the electrode during the activation of the electrode. This activation reaction leaves a structurally modified electrode that can accommodate lithium on the subsequent discharge. The activated electrode may be crystalline and may show a close crystallographic relationship to parent precursor material. Alternatively, the activated electrode may be poorly crystalline or amorphous to X-rays.

In a second embodiment, the invention relates to precursor materials for positive electrodes containing lithium and other metal cations and charge balancing anions, that contain, as a first component, one or more $Li_2O$-containing compounds such as those with Mn, Fe, and V cations. Lithium-manganese-oxides and lithium-iron-oxide compounds, in particular, have the advantages of being low cost and environmentally benign materials; vanadium oxides and lithium-vanadium-oxide compounds offer high electrochemical capacities compared to other transition metal oxide compounds. The first component of the precursor electrode materials of this invention have a lithium to metal (Li:M) ratio greater than, equal to, or less than 1:1, for example, $Li_2MnO_3$ $(Li_2O.MnO_2$, Li:Mn=2:1), $LiV_3O_8$ $(Li_2O.3V_2O_5$, Li:V=1:3), $Li_3VO_4$ $(3Li_2O.V_2O_5$, Li:V=3:1), $Li_5FeO_8$ $(Li_2O.5Fe_2O_3$, Li:Fe=1:5), $LiFeO_2$ $(Li_2O.Fe_2O_3$, Li:Fe=1:1), $Li_5FeO_4$ $(5Li_2O.Fe_2O_3$, Li:Fe=5:1), $Li_2TiO_3$ $(Li_2O.TiO_2$; Li:Ti=2:1). The first component may, alternatively, comprise intergrown compounds with composite structures or blended compounds containing the $Li_2O$-containing component, such as layered $Li_2MnO_3.LiMO_2$ materials in which M is typically a transition metal cation, such as Mn, Ni, Co, optionally in combination with one or more other metal cations such as Al and Mg, or the first component may comprise structurally integrated or blended $Li_2MnO_3.LiM'_2O_4$ ('layered-spinel') materials in which M' is typically comprised of Li and Mn, optionally in combination with one or more other metal cations such as Ni, Co, Mg, and Al. Alternatively, the structurally-integrated or blended component may be more complex, such as a three-component $xLi_2MnO_3.yLiMO_2.z?LiM_2O_4$ (x+y+z=1) or a higher order system. The electrode precursor materials of this invention comprise, as a second component, one or more electrode materials in either a charged or partially-charged state. Such charged and partially charged materials are well known in the art to be able to react electrochemically with lithium, for example, by a displacement reaction or by accommodating lithium within its structure, the second component being selected preferably, but not exclusively, from a metal oxide, a lithium metal oxide, a metal phosphate, or a metal sulfate, such as $MnO_2$, $V_2O_5$, $Li_{1+x}V_3O_8$ ($0 \le x \le 0.3$), $Fe_2O_3$, $Li_{1-y}FePO_4$ ($0<y\le 1$) or $Fe_2(SO_4)_3$, with the proviso that at least one of the electrode components does not contain manganese. The second component can also be a $Li_2O$-containing material, such as $LiV_3O_8$ ($Li_2O.3V_2O$), which is an example of a charged cathode that can react electrochemically with lithium by accommodating at least three lithium ions within its structure to form $Li_4V_3O_8$ as reported by de Picciotto et al in Solid State Ionics, Volume 62, page 297 (1993). On the other hand, the composition $Li_{1.2}V_3O_8$ is an example of a partially charged cathode material because it is possible to extract 0.2 lithium ions to reach its fully charged state $LiV_3O_8$ ($Li_2O.3V_2O_5$). Likewise, $MnO_2$ is an example of a fully charged electrode material that can react with one lithium to form $LiMnO_2$ and $Li_{0.5}MnO_2$ (or $LiMn_2O_4$ spinel) represents an example of a partially charged cathode because it can react with 0.5 lithium ions to form $LiMnO_2$ and because 0.5 lithium ions can also be extracted from $Li_{0.5}MnO_2$ to produce the fully charged electrode material $MnO_2$. The charged electrode components of the electrode precursors of this invention should preferably provide a capacity of at least 100 mAh/g in a lithium electrochemical cell, whereas the partially charged electrode materials should provide a capacity of at least 50 mAh/g in the cell.

In a third embodiment of this invention, the $Li_2O$ constituent of the $Li_2O$-containing components is extracted from the electrode precursors to activate the electrode either directly by electrochemical methods at a sufficiently high potential in an electrochemical cell or by chemical methods, e.g., by reaction with an acidic solution having a $0<pH<7$ prior to loading the electrode in a fully-charged or partially charged cell. The acid may be either an inorganic acid or an organic acid, preferably an inorganic acid comprising HF, HCl, $HNO_3$ or $H_3PO_4$. When the $Li_2O$ component is extracted electrochemically from the positive electrode, the lithium ions are removed with the concomitant release of oxygen that can either evolve as a gas or react with the surrounding electrolyte. The principal advantage of this invention is that the $Li_2O$ component of the positive electrode precursor can act as a source of surplus lithium to load a negative electrode during the activation step and that this lithium can be used during a subsequent discharge reaction not only with the host electrode component from whence it came, but also with the charged or partially charged components in the parent electrode that are susceptible to reaction with lithium, as described hereinbefore, thereby maximizing the use and capacity of the overall electrode.

The present invention encompasses methods for synthesizing the precursor positive electrodes, as well as electrochemical lithium cells and batteries containing such precursor electrodes.

The principles of this invention are described with respect to the following idealized reactions:

1. Composition of precursor electrode: $Li_2MnO_3$:2 $Li_{1.2}V_3O_8$,

Initial charge reaction at the electrode:

$$Li_2MnO_3+2Li_{1.2}V_3O_8 \rightarrow MnO_2+3V_2O_5+4.4Li^++O_2+4.4e^-$$

Subsequent discharge reaction:

$$4.4Li^++MnO_2+3V_2O_5+4.4e^- \rightarrow LiMnO_2+3Li_{1.33}V_2O_5.$$

2. Composition of precursor electrode: 4 $Li_5FeO_4$:18 $Fe_2O_3$

Initial charge reaction at the electrode:

$$4Li_5FeO_4+18Fe_2O_3 \rightarrow 20Fe_2O_3+20Li^++5O_2+20e^-$$

Subsequent discharge reaction:

$$20Li^++20Fe_2O_3+20e^- \rightarrow 20LiFe_2O_3.$$

3. Composition of precursor electrode: $Li_2MnO_3.LiMn_{0.5}Ni_{0.5}O_2$+2 $Li_{1.2}V_3O_8$ Initial charge reaction at the electrode:

$$Li_2MnO_3.LiMn_{0.5}Ni_{0.5}O_2+2Li_{1.2}V_3O_8 \rightarrow MnO_2.Mn_{0.5}Ni_{0.5}O_2+3V_2O_5+5.4Li^++O_2+5.4e^-$$

Subsequent discharge reaction:

$$5.4Li^++MnO_2.Mn_{0.5}Ni_{0.5}O_2+3V_2O_5+5.4e^- \rightarrow LiMnO_2.LiMn_{0.5}Ni_{0.5}O_2+3Li_{1.133}V_2O_5.$$

4. Composition of precursor electrode: $Li_2MnO_3.LiMn_{0.5}Ni_{0.5}O_2+FePO_4$

Initial charge reaction at the electrode:

$$Li_2MnO_3.LiMn_{0.5}Ni_{0.5}O_2+FePO_4 \rightarrow MnO_2.Mn_{0.5}Ni_{0.5}O_2+3.0Li^++FePO_4+\tfrac{1}{2}O_2+3.0e^-$$

Subsequent discharge reaction:

$$3.0Li^++MnO_2.Mn_{0.5}Ni_{0.5}O_2+FePO_4+3.0e^- \rightarrow LiMnO_2.LiMn_{0.5}Ni_{0.5}O_2+LiFePO_4.$$

The overall principles of the invention are demonstrated by the following practical examples:

Example 1

Figure 1:
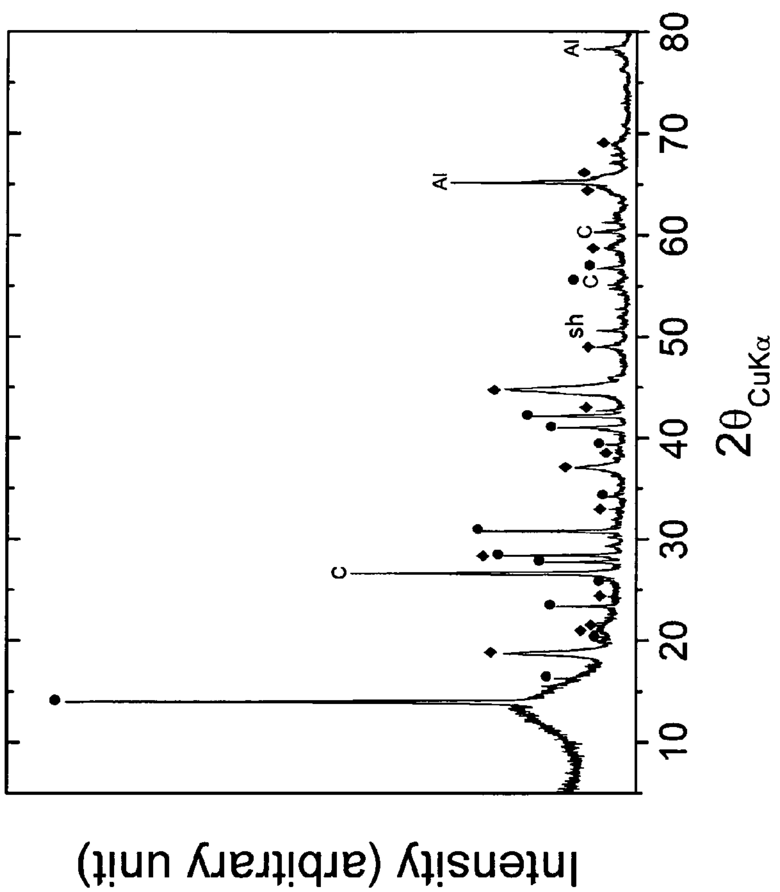
FIG. 1 is an illustration of the powder X-ray diffraction pattern of a composite $0.74Li_2MnO_3.0.26Li_{1.2}V_3O_8$ electrode powder prepared at 300° C.

A positive electrode precursor with the nominal composition $0.74Li_2MnO_3.0.26Li_{1.2}V_3O_8$ was prepared by intimately mixing individually-prepared $Li_2MnO_3$ and $Li_{1.2}V_3O_8$ powders in the desired stoichiometric ratio and subsequently heating the mixture at about 300° C. in air for 24 hours. The $Li_{1.2}V_3O_8$ precursor was prepared by mixing $Li_2CO_3$ and $NH_4VO_3$ powders and thereafter calcining them at about 450° C. for 48 hours in air. The $Li_2MnO_3$ precursor sample was prepared by mixing and calcining $Li_2CO_3$ and $MnCO_3$ powders under the same preparative conditions as the $Li_{1.2}V_3O_8$ sample. The X-ray diffraction pattern of the $0.74Li_2MnO_3.0.26Li_{1.2}V_3O_8$ product is shown in FIG. 1.

Electrochemical tests of the $0.74Li_2MnO_3.0.26Li_{1.2}V_3O_8$ electrodes were conducted in lithium 'half' cells as follows. The electrodes for each lithium cell were fabricated from a mixture of 84 wt % of $0.74Li_2MnO_3.0.26Li_{1.2}V_3O_8$ electrode powder, 8 wt % polyvinylidene difluoride (PVDF) polymer binder (Kynar, Elf-Atochem), 4 wt % acetylene black (Cabot), and 4 wt % graphite (SFG-6, Timcal) slurried in 1-methyl-2-pyrrolidinone (NMP) (Aldrich, 99+%). An electrode laminate was cast from the slurry onto an Al current collector foil using a doctor-blade. The laminate was subsequently dried, first at about 75° C. for about 10 hours, and thereafter under vacuum at about 70° C. for about 12 hours. The electrolyte was 1 M $LiPF_6$ in a 1:1 mixture of ethylene carbonate (EC) and ethylmethyl carbonate (EMC). The electrodes were evaluated at room temperature in coin-type cells (size CR2032, Hohsen) with a lithium foil counter electrode (FMC Corporation, Lithium Division) and a polypropylene separator (Celgard 2400). Cells were assembled inside a He-filled glovebox (<5 ppm, $H_2O$ and $O_2$) and cycled on a Maccor Series 2000 tester under galvanostatic mode using a constant current density of about 0.05 mA/cm$^2$ between 4.8 and 2.0 V.

Figure 2:
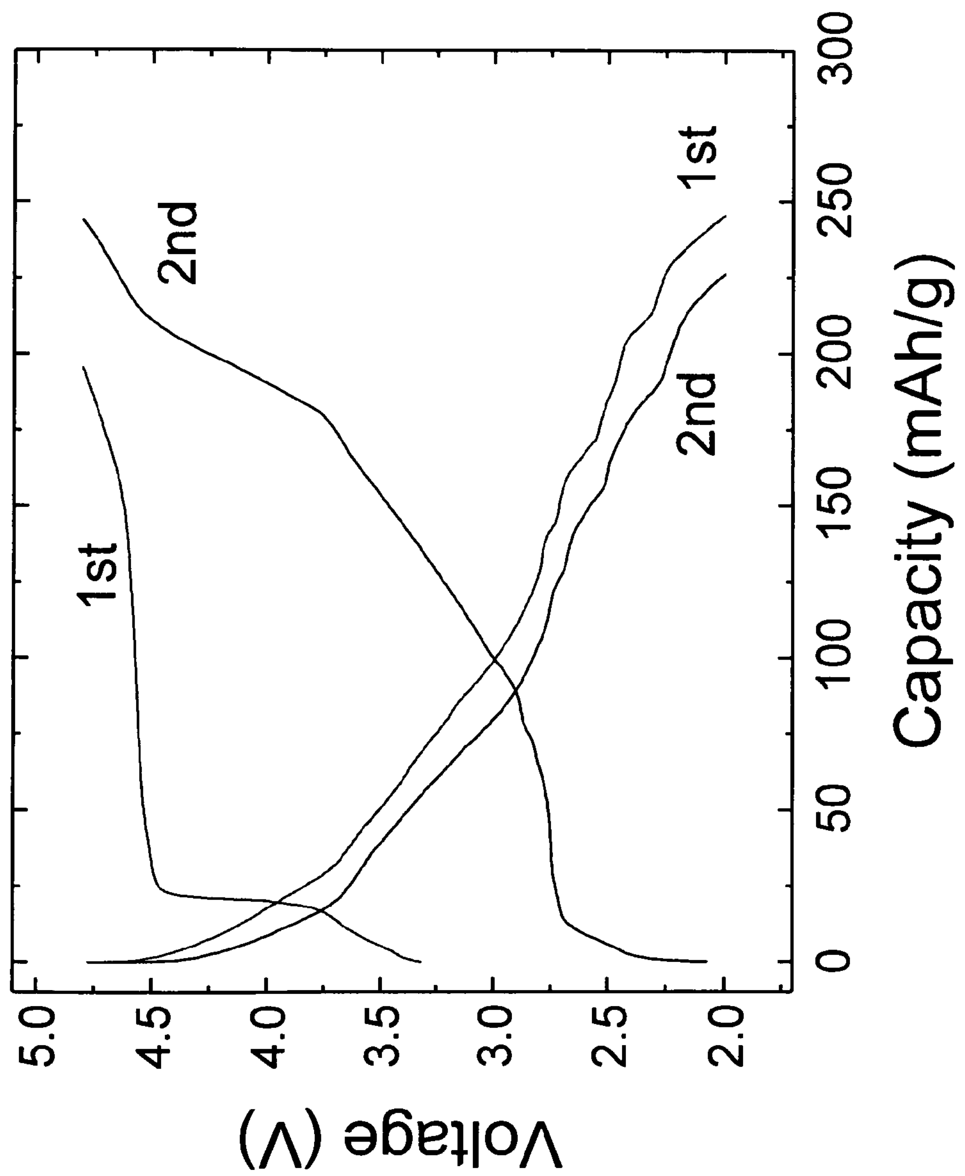
FIG. 2 is a graphical representation of the relationship between the voltage and capacity for an initial charge and subsequent discharge/cycles of a $Li/0.74Li_2MnO_3.0.26Li_{1.2}V_3O_8$ cell operated at room temperature.
Figure 3:
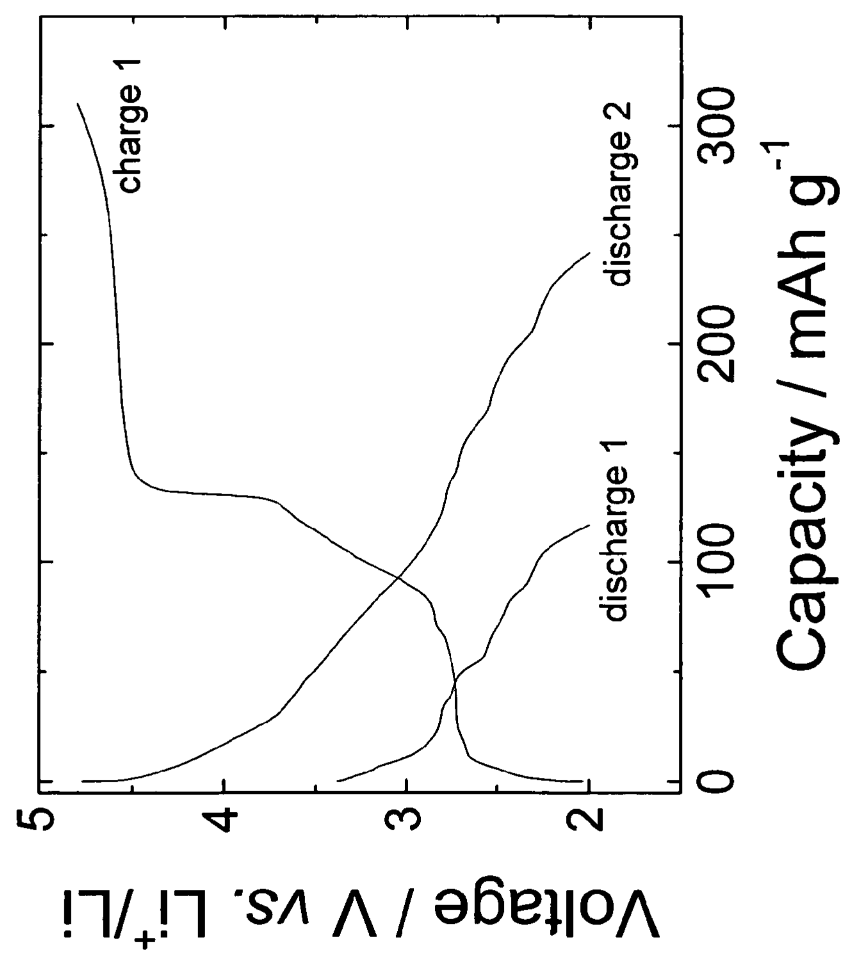
FIG. 3 is a graphical representation of the relationship between the voltage and capacity for an initial discharge and subsequent charge/discharge cycle of a $Li/0.74Li_2MnO_3.0.26Li_{1.2}V_3O_8$ cell operated at room temperature.

The voltage profiles of the first two charge/discharge cycles of a Li/0.74$Li_2MnO_3$.0.26$Li_{1.2}V_3O_8$ cell, cycled between 4.8 and 2.0 V are shown in FIG. 2, whereas the voltage profiles of an identical cell that was discharged first, followed by one charge/discharge cycle between the same voltage limits are shown in FIG. 3. In FIG. 2, the capacity withdrawn from the 0.74$Li_2MnO_3$.0.26$Li_{1.2}V_3O_8$ electrode between 3.3 and 4.0 V on the initial charge is attributed to the extraction of Li from the $Li_{1.2}V_3O_8$ component with a concomitant oxidation of $V^{4+}$ to $V^{5+}$; the capacity withdrawn from the electrode above 4.0 V is attributed to the irreversible extraction of $Li_2O$ from the $Li_2MnO_3$ component that yields an electrochemically active $MnO_2$ component that can accommodate lithium within its structure on the subsequent discharge. The voltage profile of the second charge process differs significantly from the first charge process (FIG. 2) as a result of the activation of the precursor electrode, whereas the profile of the second discharge closely follows that of the first, reflecting the reversibility of the activated electrode reaction. The capacity delivered between 4.5 and about 3.0 V is attributed predominantly to the $MnO_2$ component of the electrode, whereas the capacity delivered in a series of steps between 3.0 and 2.0 V is attributed predominantly to the vanadium oxide component of the electrode. FIG. 3 demonstrates that when a similar cell is initially discharged (discharge 1), lithium is inserted only into the $Li_{1.2}V_3O_8$ component, not the unactivated $Li_2MnO_3$ component, and that activation of the $Li_2MnO_3$ component occurs on the subsequent charge. Thereafter, the cell discharges in a like manner to that shown in FIG. 2. FIGS. 2 and 3 demonstrate that a high electrochemical discharge capacity of approximately 250 mAh/g can be obtained from 0.74$Li_2MnO_3$.0.26$Li_{1.2}V_3O_8$ electrode precursors when activated to 4.8 V and subsequently cycled to 2.0 V in a lithium cell. This capacity is significantly higher than the capacity obtained in practice from conventional $LiCoO_2$ (layered), $LiMn_2O_4$ (spinel) and $LiFePO_4$ (olivine) electrodes.

Example 2

Figure 4:
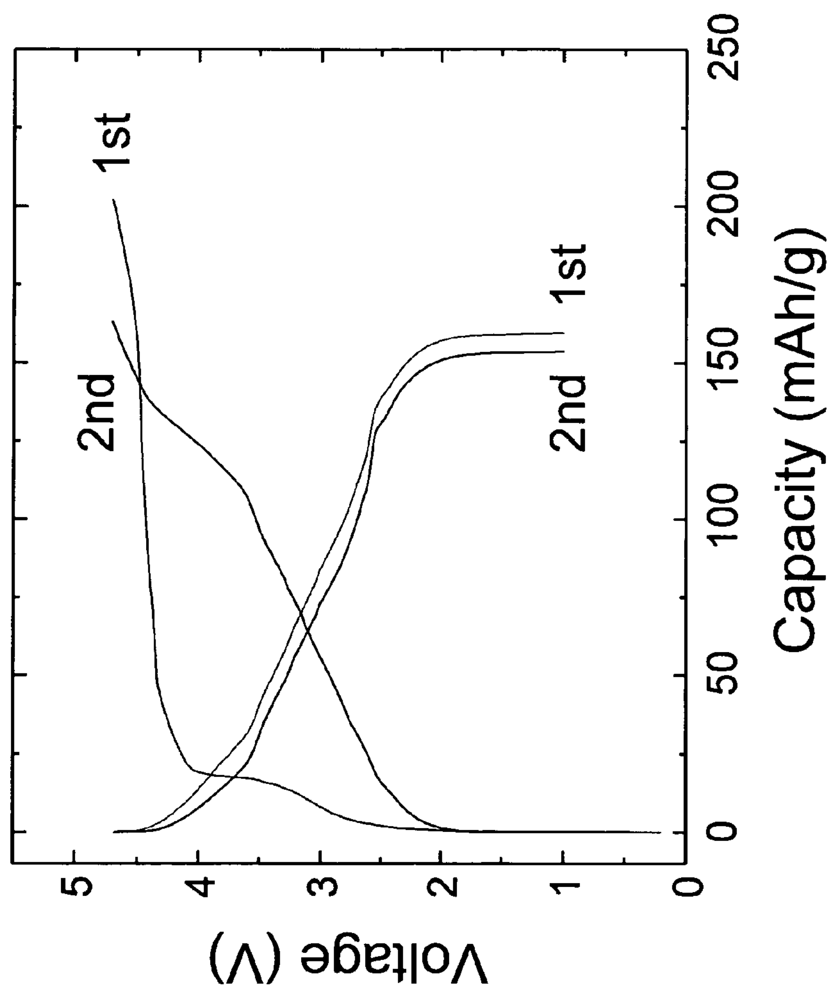
FIG. 4 is a graphical representation of the relationship between the voltage and capacity for an initial charge and subsequent discharge/charge cycles of a $C_6/0.74Li_2MnO_3.0.26Li_{1.2}V_3O_8$ cell operated at room temperature.

The 0.74$Li_2MnO_3$.0.26$Li_{1.2}V_3O_8$ electrodes of Example 1 were also evaluated in lithium-ion 'full' cells containing MCMB graphitic anodes. Cells were cathode limited. The cells were cycled between 4.7 and 1.0 V at 0.05 mA/$cm^2$. The voltage profiles of the initial charge and subsequent discharge/charge cycles of a typical cell are shown in FIG. 4, which demonstrates the reversibility of the activated 0.74$Li_2MnO_3$.0.26$Li_{1.2}V_3O_8$ electrodes in a lithium-ion cell configuration. The relatively low rechargeable capacity obtained from the positive electrode (approximately 150 mAh/g) is attributed to the excess MCMB graphite that was used in the unbalanced cell and to the relatively high $Li_2MnO_3$ content in the electrode. Improvements in the electrode capacity and cycling efficiency can be expected by increasing the $Li_{1.2}V_3O_8$ content in the electrode relative to $Li_2MnO_3$, and by balancing the required relative amounts of anode and cathode materials in the lithium-ion cell.

Example 3

Figure 5:
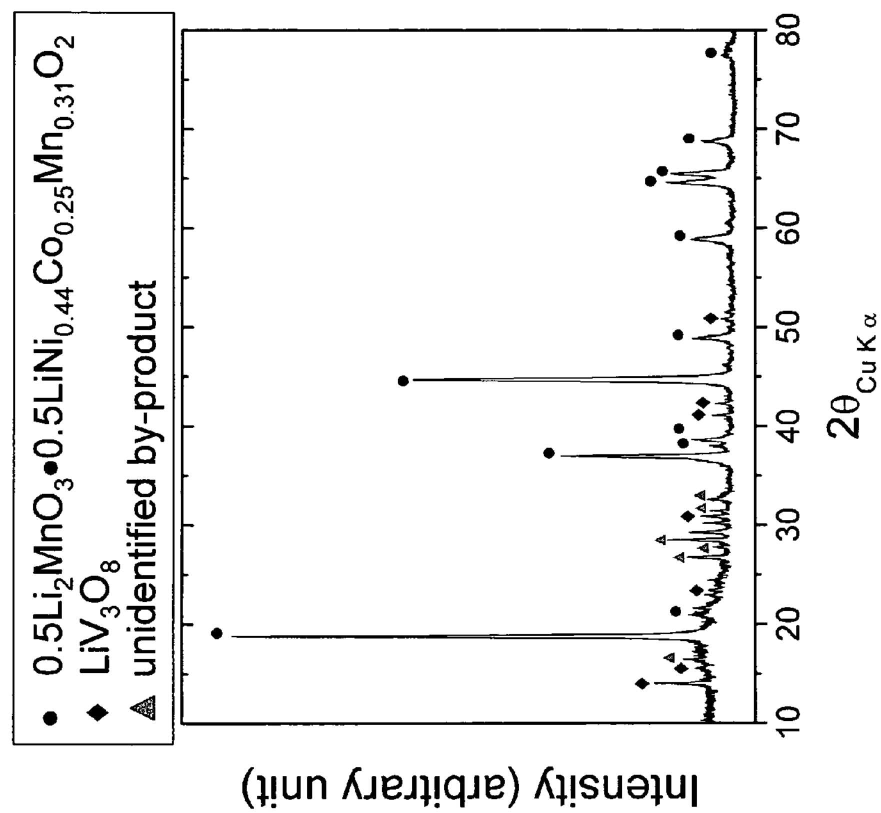
FIG. 5 is an illustration of the powder X-ray diffraction pattern of a composite Li/0.9

In this example, a precursor material, consisting of a $Li_2O$-containing 0.5$Li_2MnO_3$.0.5$LiNi_{0.44}Co_{0.25}Mn_{0.31}O_2$ component ($Li_2MnO_3$=$Li_2O.MnO_2$) and a charged $Li_{1.2}V_3O_8$ component in a 0.9:1 molar ratio was evaluated. The 0.9 (0.5$Li_2MnO_3$.0.5$LiNi_{0.44}Co_{0.25}Mn_{0.31}O_2$).0.1$Li_{1.2}V_3O_8$ precursor was prepared by mixing pre-prepared 0.5$Li_2MnO_3$.0.5$LiNi_{0.44}Co_{0.25}Mn_{0.31}O_2$ and 0.1$Li_{1.2}V_3O_8$ materials in a 0.9:01 stoichiometric ratio and heating them typically at a temperature in the range of about 100° C. to 450° C. for about 12 hours in air. The 0.5$Li_2MnO_3$.0.5$LiNi_{0.44}Co_{0.25}Mn_{0.31}O_2$ component was prepared by first intimately mixing $Li_2CO_3$ and $(Mn_{0.656}Co_{0.125}Ni_{0.219})(OH)_2$ powders and, thereafter, calcining the mixture at about 700° C. for about 36 h in air. The $Li_{1.2}V_3O_8$ precursor was prepared as described in Example 1. The X-ray diffraction pattern of 0.9 (0.5$Li_2MnO_3$.0.5$LiNi_{0.44}Co_{0.25}Mn_{0.31}O_2$).0.1$Li_{1.2}V_3O_8$ product was consistent with the typical patterns of 0.5$Li_2MnO_3$.0.5$LiNi_{0.44}Co_{0.25}Mn_{0.31}O_2$ and $Li_{1.2}V_3O_8$ materials. When heated to about 450° C., the diffraction pattern of the product showed, in addition, a minor amount of an unidentified by-product of the reaction (FIG. 5). FIG. 6*a* shows the initial charge and subsequent discharge/charge profiles of a Li/0.9(0.5$Li_2MnO_3$.0.5$LiNi_{0.44}Co_{0.25}Mn_{0.31}O_2$).0.1$Li_{1.2}V_3O_8$ cell cycled between 4.6 and 2.0 V at 0.05 mA/$cm^2$ at room temperature. FIG. 6*b* demonstrates, in a capacity vs. cycle number plot, that a rechargeable capacity greater than 200 mAh/g was delivered for 50 cycles, which is significantly higher than the capacity that can be achieved from state-of-the-art $LiCoO_2$, $LiMn_2O_4$ and $LiFePO_4$ electrodes, in accordance with the principles of this invention.

Example 4

This example demonstrates that an iron-based precursor material, consisting of a $Li_5FeO_4$ ($5Li_2O.Fe_2O_3$) component and a $LiFeO_2$ component ($Li_2O.Fe_2O_3$), represented generically in two-component notation as x$Li_5FeO_4$.(1−x)$LiFeO_2$ ($0<x<1$) can be used effectively as an electrode precursor and source of lithium for charging lithium cells. The x$Li_5FeO_4$.(1−x)$LiFeO_2$ precursor was prepared by the reaction of lithium oxide powder ($Li_2O$; Aldrich, 99+%) and iron oxide powder ($Fe_2O_3$, Aldrich 99.9%). The powders were mixed using a mortar and pestle, and then fired at about 750° C. under nitrogen for about 12 hours. The product was re-ground, pelletized and re-fired under nitrogen at about 900° C. for several hours. The two-component character of this precursor was confirmed by powder X-ray diffraction (CuKα radiation) (FIG. 7). A quantitative analysis of the diffraction pattern revealed that the product contained approximately 40 to 50% $LiFeO_2$ and 50 to 60% $Li_5FeO_4$. FIG. 8 demonstrates that the electrochemical extraction of lithium from the x$Li_5FeO_4$.(1−x)$LiFeO_2$ ($0.5 \le x < 0.6$) precursor in a lithium cell, assembled according to the methods described in Examples 1, 2 and 3, and cycled between 5.0 and 1.5 V at 0.05 mA/$cm^2$, occurs in a two-step process, consistent with the two-component character of the precursor material, the first process occurring at a lower potential (about 4.0 V vs. Li/Li) than the extraction of lithium from the $Li_2MnO_3$ component of the corresponding 0.74$Li_2MnO_3$0.26$Li_{1.2}V_3O_8$ electrode precursor in FIG. 2 (>4.5 V vs. Li/$Li^+$). The large irreversible capacity loss that occurs on the initial cycle is attributed to the surplus of lithium that can be withdrawn from the x$Li_5FeO_4$(1−x)$LiFeO_2$ precursor electrode during charge (443 mAh/g) and the relatively small quantity of lithium that could be introduced into the activated $Fe_2O_3$ electrode component on the subsequent discharge (112 mAh/g) (FIG. 8). This phenomenon can be understood by considering a x$Li_5FeO_4$.(1−x)$LiFeO_2$ electrode that contains equimolar amounts of $Li_5FeO_4$ ($Li_2O.Fe_2O_3$) and $LiFeO_2$ ($Li_2O.Fe_2O_3$) (i.e., x=0.5). Such an electrode would yield a theoretical capacity of 645 mAh/g during charge if all the $Li_2O$ was withdrawn from the two components, but would deliver a theoretical capacity of only 215 mAh/g if the resulting activated $Fe_2O_3$ electrode was completely discharged to $LiFe_2O_3$. Essentially all the capacity of the $Li/xLi_5FeO_4.(1-x)LiFeO_2$ electrode of this Example that was delivered on the initial discharge could be recovered on the second charge to 4.8 V, reflecting the reversible redox chemistry of the $Fe^{3+}/Fe^{2+}$ couple in the electrode (FIG. 9). Such iron-based electrodes with a high $Li_2O$ content therefore have particular utility in composite electrode systems that also contain an appreciable amount of a charged, high capacity component in the electrode precursor, such as $V_2O_5$, $LiV_3O_8$ and $MnO_2$, and for supplying high capacity anode materials with sufficient lithium to offset irreversible capacity phenomena, as often observed in metal, semi metal and intermetallic electrode systems.

Example 5

A charged $FePO_4$ precursor electrode component was synthesized from a commercial $LiFePO_4$ (olivine) sample. The $LiFePO_4$ sample was chemically delithiated with a 2-fold excess of $NO_2BF_4$ in an acetonitrile solvent. The powder was isolated by suction filtration and washed multiple times with fresh acetonitrile. Lithium full cells (lithium-ion configuration) were constructed with a graphite (MCMB) anode and a cathode of physically blended $Li_5FeO_4.FePO_4$ materials in a 1:1 molar ratio. The cathode compartment consisted of 80% $Li_5FeO_4.FePO_4$, 8% PVDF binder, and 6% graphite and 6% acetylene black as current collecting media. The electrolyte consisted of a 1.2 M $LiPF_6$ solution in ethylene carbonate: ethylmethyl carbonate (3:7 molar ratio). Cells were first charged to 4.75 V at a current density of 0.1 $mA/cm^2$, then discharged to 2.5 V; subsequent cycles were limited to the voltage window 2.25 to 4.2 V (FIG. 10). The data in FIG. 10 clearly demonstrates the principles of the invention with respect to an iron-based electrode. During the initial charge, lithium is extracted from the highly lithium-rich $Li_5FeO_4$ ($5Li_2O.Fe_2O_3$) component of the precursor electrode (as $Li_2O$) and inserted into the MCMB graphite anode. On the subsequent discharge, lithium is inserted into the $FePO_4$ charged component of the precursor electrode to a cut off voltage of 2.25 V, delivering a discharge capacity of approximately 100 mAh/g, indicating the likelihood that the charged $FePO_4$ component of the electrode delivered all its capacity, the theoretical capacity of the $FePO_4$ component in this electrode composition being 88 mAh/g. The balance of the capacity (12 mAh/g) is attributed to the $Fe_2O_3$ component of the charged electrode derived from $Li_5FeO_4$. Further capacity can be expected from these activated $Li_5FeO_4.FePO_4$ electrodes if discharged to 1.5 V, when further reduction of the $Fe_2O_3$ component can occur, as demonstrated by the electrochemical data of the $Li/xLi_5FeO_4.(1-x)LiFeO_2$ cell shown in FIG. 9.

Example 6

Figure 11A:
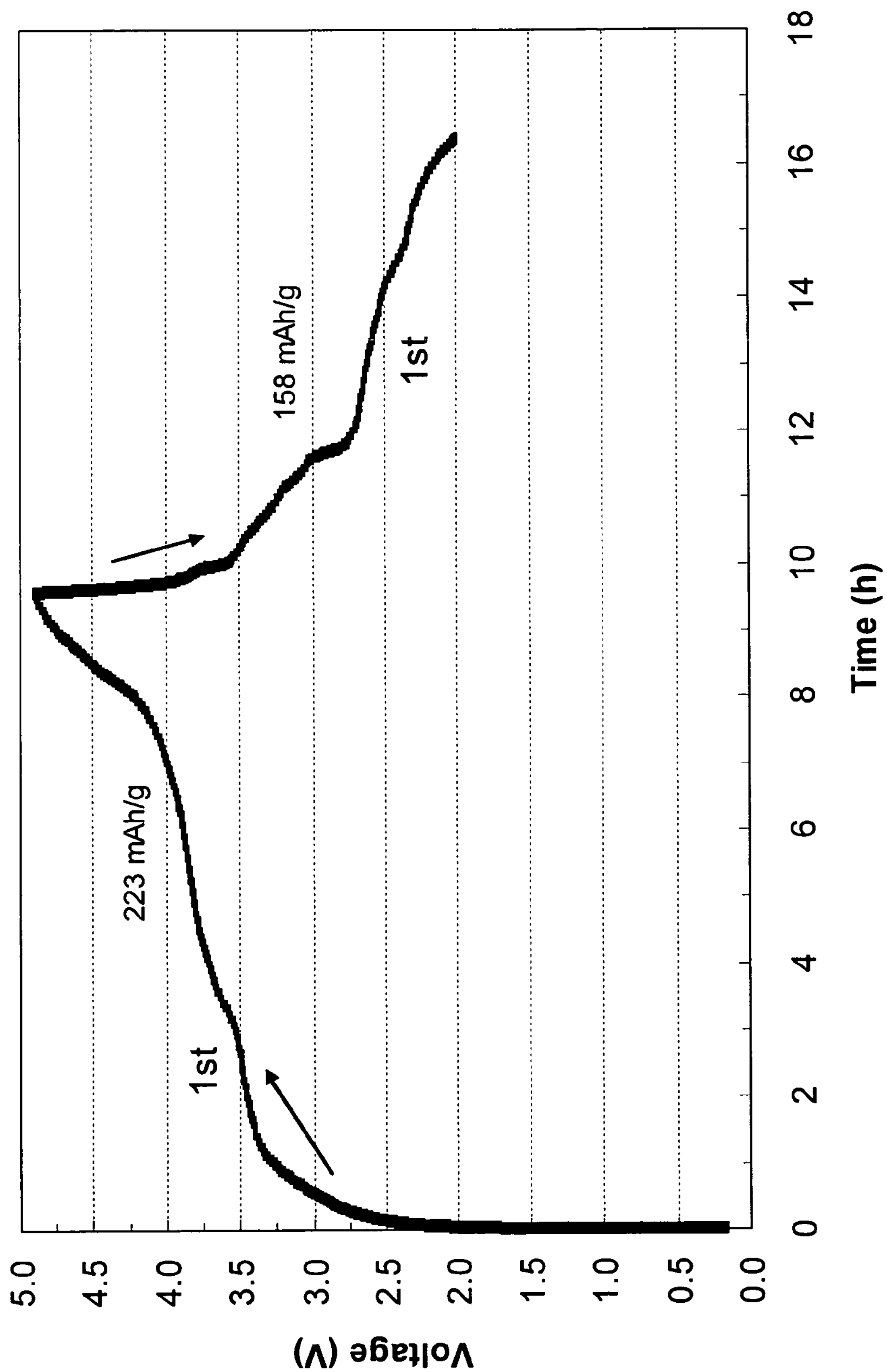
Figure 11B:
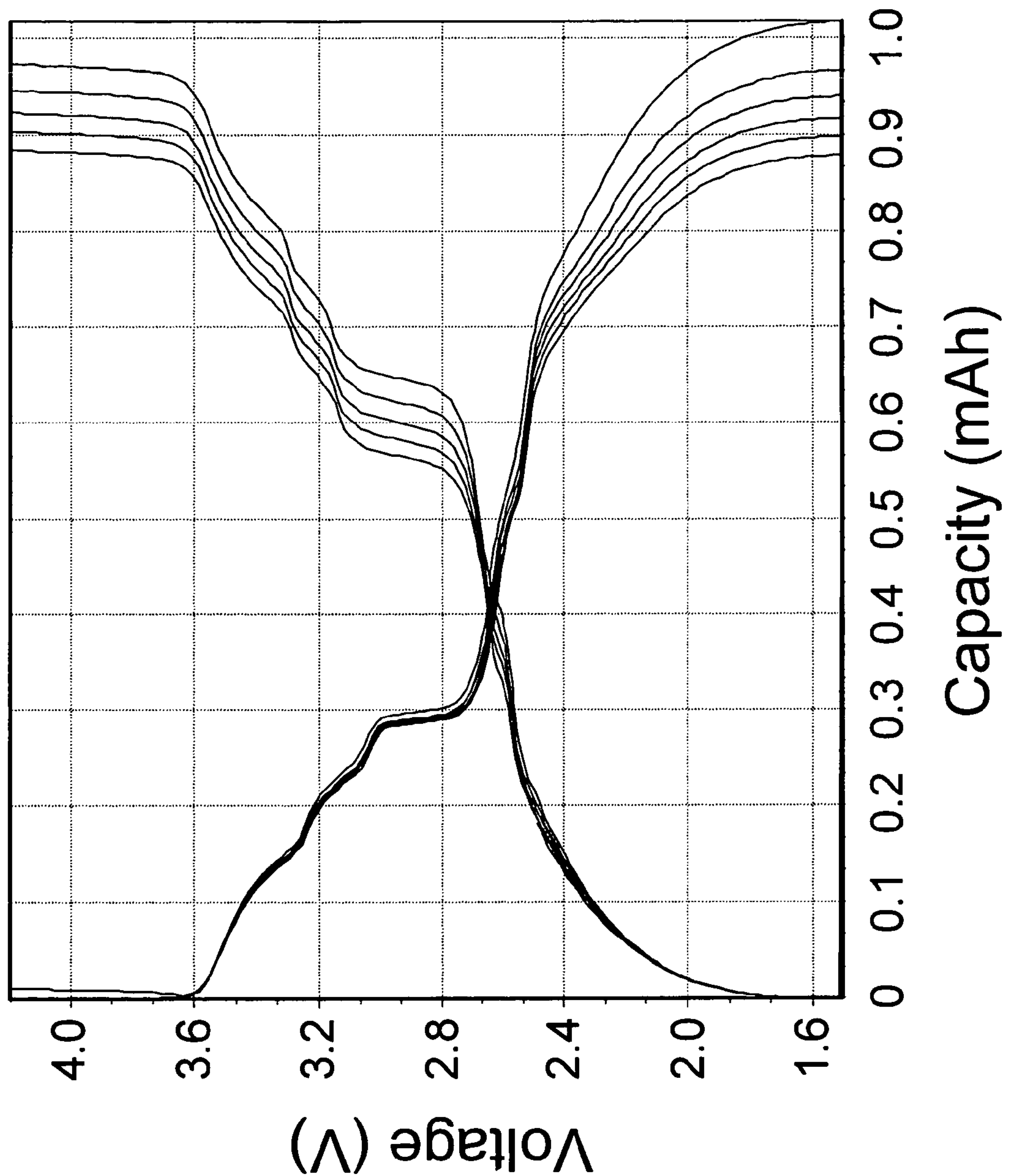

A $Li_{1.2}V_3O_8$ sample was synthesized by the reaction of vanadium oxide with lithium hydroxide monohydrate for 10 h in the appropriate mole ratio at 680° C. in air. The $Li_5FeO_4$ was made by reacting iron-oxide and lithium hydroxide monohydrate in nitrogen at 700° C. for 72 h. A lithium-ion cell was constructed in a similar fashion to that described n in Example 5 using a 1:1 molar ratio of $Li_{1.2}V_3O_8$ and $Li_5FeO_4$ as the cathode. The cell was charged to 4.9 V and then subsequently discharged to 2.0 V at 0.1 $mA/cm^2$ to evaluate the effectiveness of using $Li_5FeO_4$ ($5Li_2O.Fe_2O_3$) as a source of lithium in the electrode precursor to load the MCMB graphite anode. The initial charge/discharge profile of this cell is shown in FIG. 11*a*. The data demonstrate that during charge 223 mAh/g of capacity was withdrawn from the electrode to load the MCMB anode with lithium and that 158 mAh/g was delivered by the $Fe_2O_3.LiV_3O_8$ component formed during charge. The discharge voltage profile is characteristic of that expected from $LiV_3O_8$, and the delivered capacity is approximately 87% of the theoretical capacity value expected for the $LiV_3O_8$ component of the composite electrode (181 mAh/g), thereby confirming the utility of the $Li_5FeO_4.Li_{1.2}V_3O_8$ precursor electrode of this invention in a lithium-ion cell configuration. FIG. 11*b* shows the charge/discharge profiles of the cell for the subsequent six discharge cycles, showing the unoptimized rechargeable behavior of the lithium-iron-vanadium-oxide electrode.

This invention therefore relates to lithium-rich compounds that can be used as precursors for positive electrodes in both primary and secondary (rechargeable) lithium cells and batteries, a typical cell being shown schematically in FIG. 12, represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not fully described herein, but are included as is understood by those of ordinary skill in this art. FIG. 13 shows a schematic illustration of one example of a battery in which two strings of electrochemical lithium cells, described above, are arranged in parallel, each string comprising three cells arranged in series. The invention also includes methods for making the lithium-rich precursor electrode compounds and methods for activating the precursor electrodes in lithium cells and batteries including the same.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. It is also understood that additional improvements in the capacity and stability of the electrodes can be expected to be made in the future by improving and optimizing the processing techniques whereby lithium-rich compounds can be fabricated and incorporated as electrodes in electrochemical lithium cells.

The embodiments of the invention in which an exclusive property or privilege is claimed are defined as follows:

1. An activated positive electrode for a non-aqueous lithium cell prepared by combining:

(a) a first component containing one or more metal cation- and $Li_2O$-containing materials; and (b) a second component containing one or more charged or partially-charged metal cation-containing electrode materials selected from the group consisting of a charged or partially charged lithium metal oxide, a charged or partially charged metal phosphate, and a charged or partially charged metal sulfate, which can accommodate lithium within their structure during the charging and discharging of the electrode when included in an electrochemical cell, to form a precursor material; fabricating an electrode from the precursor material, and subsequently electrochemically activating the electrode by applying a sufficiently high potential to the electrode in an electrochemical cell also including a negative electrode and a non-aqueous electrolyte to remove $Li_2O$ from the precursor material;

with the proviso that at least one of the first and second components does not contain manganese.

2. The electrode of claim 1, wherein the first component comprises an intergrown or blended composite structure comprising two or more $Li_2O$-containing components of different molecular structure.

3. The electrode of claim 1, wherein the metal cations of the first component comprise one or more of Mn, V, Fe and Ti cations.

4. The electrode of claim 3, wherein the first component comprises one or more materials selected from the group consisting of $Li_2O.MnO_2$, $Li_2O.3V_2O_5$, $3Li_2O.V_2O_5$, $Li_2O.2.5Fe_2O_3$, $Li_2O.Fe_2O_3$, $5Li_2O.Fe_2O_3$, and $Li_2O.TiO_2$.

5. The electrode of claim 3, wherein the first component comprises one or more materials selected from the group consisting of a $Li_2MnO_3$ and $LiMO_2$-containing material and a $Li_2MnO_3$ and $LiM'_2O_4$-containing material; wherein M and M' are independently one or more metal cations.

6. The electrode of claim 5, wherein M comprises one or more of Mn, Ni, and Co; and wherein M' comprises Li and Mn.

7. The electrode of claim 1, wherein the second component comprises one or more of $Li_{1+x}V_3O_8$ in which $0 \le x \le 0.3$, $Li_{1-y}FePO_4$ in which $0<y\le 1$, and $Fe_2(SO_4)_3$.

8. The electrode of claim 1, wherein first component comprises one or more materials selected from the group consisting of $Li_2O.MnO_2$, $Li_2O.3V_2O_5$, $3Li_2O.V_2O_5$, $Li_2O.2.5Fe_2O_3$, $Li_2O.Fe_2O_3$, $5Li_2O.Fe_2O_3$, and $Li_2O.TiO_2$; and the second component comprises one or more of $Li_{1+x}V_3O_8$ in which $0 \le x \le 0.3$, $Li_{1-y}FePO_4$ in which $0<y\le 1$, and $Fe_2(SO_4)_3$.

9. A non-aqueous lithium electrochemical cell comprising a negative electrode, an electrolyte, and an activated positive electrode of claim 1.

10. The electrochemical cell of claim 9, wherein the positive electrode is activated in the electrochemical cell whereby the $Li_2O$ removed from the positive electrode in the electrochemical cell loads lithium into the negative electrode of the cell.

11. The electrochemical cell of claim 10, wherein the negative electrode of the electrochemical cell comprises one or more of a carbon material, a metal material, a semi-metal material, an intermetallic material, and a metal oxide material.

12. The electrochemical cell of claim 11, wherein the negative electrode of the electrochemical cell comprises one or more of graphite, Sn, Si, $Cu_6Sn_5$, and $Li_4Ti_5O_{12}$.

13. A non-aqueous lithium battery comprising a plurality of electrically connected electrochemical cells, each electrochemical cell including a negative electrode, an electrolyte, and an activated positive electrode of claim 1.

14. An activated positive electrode for a non-aqueous lithium cell prepared by combining (a) a first component containing one or more metal cation- and $Li_2O$-containing materials; and (b) a second component containing one or more charged or partially-charged metal cation-containing electrode materials selected from the group consisting of a charged or partially charged lithium metal oxide, a charged or partially charged metal phosphate, and a charged or partially charged metal sulfate, which can accommodate lithium within their structure during the charging and discharging of the electrode when included in an electrochemical cell, to form a precursor material; fabricating an electrode from the precursor material, and subsequently activating the electrode by contacting the electrode with an acid to remove $Li_2O$ from the precursor material; with the proviso that at least one of the first and second components does not contain manganese.

15. The electrode of claim 14, wherein the first component comprises one or more materials selected from the group consisting of $Li_2O.MnO_2$, $Li_2O.3V_2O_5$, $3Li_2O.V_2O_5$, $Li_2O.2.5Fe_2O_3$, $Li_2O.Fe_2O_3$, $5Li_2O.Fe_2O_3$, and $Li_2O.TiO_2$.

16. A non-aqueous lithium electrochemical cell formed by combining an activated positive electrode of claim 14 with a fully charged or partially charged negative electrode, an electrolyte.

17. The electrochemical cell of claim 16, wherein the negative electrode of the electrochemical cell comprises one or more of graphite, Sn, Si, $Cu_6Sn_5$, and $Li_4Ti_5O_{12}$.

18. A non-aqueous lithium battery comprising a plurality of electrically connected electrochemical cells of claim 17.

* * * * *